United States Patent [19]

Treppner

[11] Patent Number: 4,631,835
[45] Date of Patent: Dec. 30, 1986

[54] ADJUSTABLE ANGLE BLOCK APPARATUS

[76] Inventor: Bernaht C. Treppner, 4537 W. Gardenia Ave., Glendale, Ariz. 85301

[21] Appl. No.: 764,671
[22] Filed: Aug. 12, 1985
[51] Int. Cl.$^4$ .............................................. G01B 3/30
[52] U.S. Cl. ...................................................... 33/536
[58] Field of Search ................. 33/534, 536, 538, 535, 33/451, 465, 471, 162, 531, 530

[56] References Cited

U.S. PATENT DOCUMENTS

| | | | |
|---|---|---|---|
| 1,869,278 | 7/1932 | Ramelli | 33/534 X |
| 3,195,238 | 7/1965 | Grenell | 33/538 X |
| 3,389,473 | 6/1968 | O'Connor | 33/538 |
| 3,820,247 | 6/1974 | Casey et al. | 33/537 |
| 3,862,498 | 1/1975 | Klucznik | 33/538 |

Primary Examiner—Harry N. Haroian
Attorney, Agent, or Firm—Herbert E. Haynes, Jr.

[57] ABSTRACT

An adjustable angle block apparatus for aiding in the making of set-ups in tooling, production, inspection and the like in the machining art is provided with a pivotably connected pair of bars having a first device for establishing non-precision angular relationships between the two bars and a second device for establishing high precision angular relationships therebetween.

6 Claims, 6 Drawing Figures

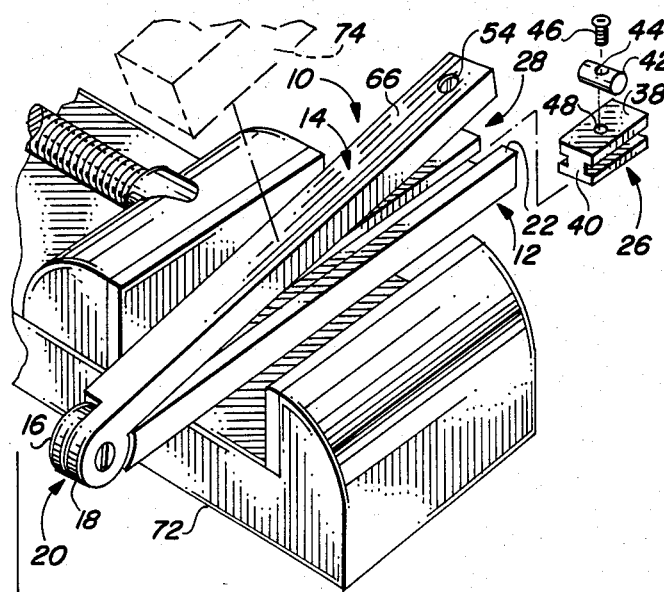
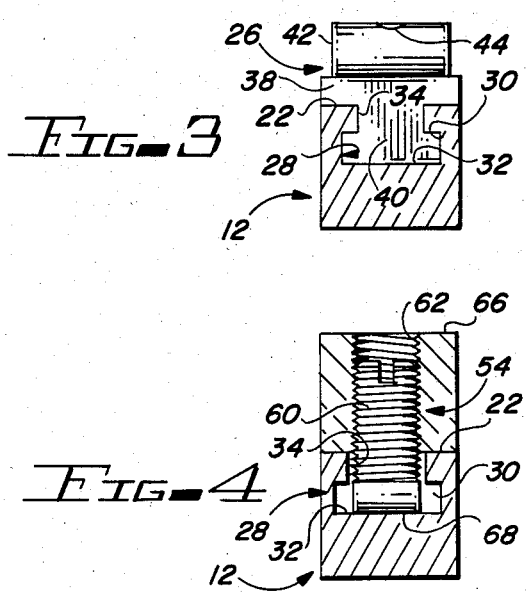
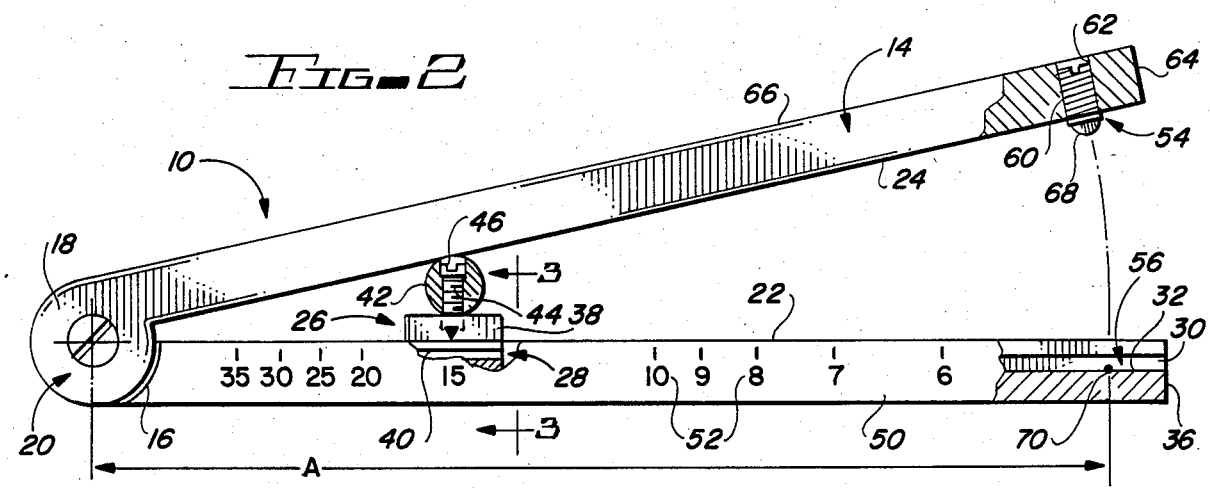
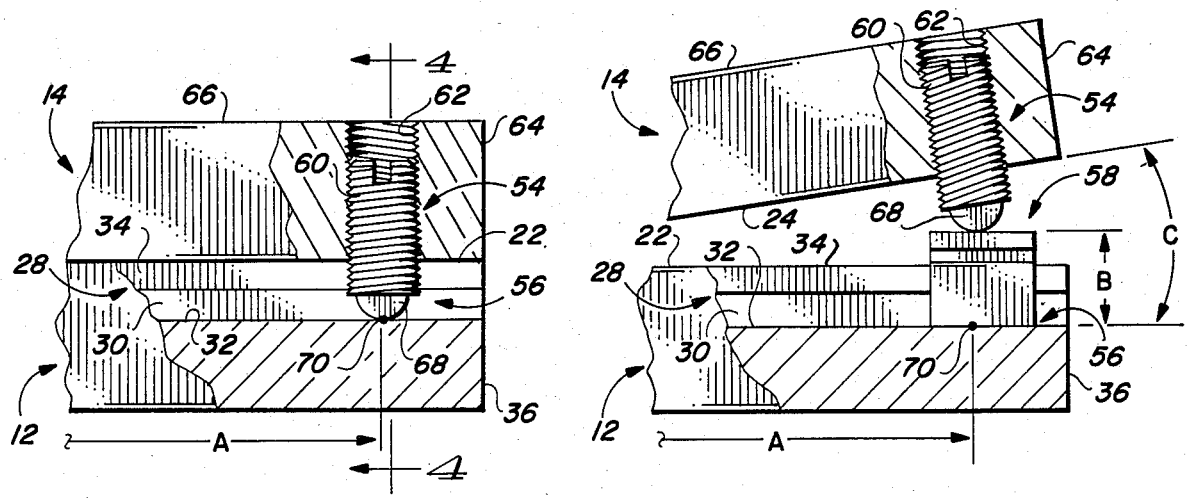

ADJUSTABLE ANGLE BLOCK APPARATUS

BACKGROUND OF THE INVENTION

1. Field of the Invention

This invention relates in general to precision instruments of the type used in making angular set-ups in the machining arts and more particularly to an adjustable angle block apparatus having a precision sine plate adjustment capability.

2. Background of the Invention

Precision instruments of the type commonly referred to as angle blocks or angle plates are used extensively for making angular set-ups for tooling, production and inspection work in the machining arts. Such angle blocks, or angle plates, are provided in sets with each angle block or plate of the set being a relatively thin plate-like structure with each block or plate defining a different angle. For example, a typical set of angle blocks may include ten separate angle blocks with a first block defining a 1° angle and the second through fifth blocks defining 2° through 5° angles. The remaining five blocks of the set being provided in 5° increments up to 30°. Another typical set of such instruments may include two angle plates with a first one defining 45°-45°-90° angles and a second one defining 30°-60°-90° angles.

In that such angle blocks or angle plates are precision instruments, they are expensive, and must be purchased in sets to provide versatility in making the required angular set-ups.

Even when a set, such as the above described ten block set or two plate set is available for use by the person making a set-up, their use is limited to those specific angles defined by the various pieces of the set.

To the best of my knowledge, no adjustable angle block, or angle plate, apparatus has been suggested or devised which will allow precision set-ups to be made at adjustably variable angles.

SUMMARY OF THE INVENTION

In accordance with the present invention, a new and useful angle block apparatus is disclosed which may be precisely adjusted at various angles for making set-ups for tooling, production, inspection and similar tasks in the machining arts.

The angle block apparatus includes a pair of elongated bars which are pivotably interconnected at aligned ends thereof. A first one of the bars is hereinafter referred to as a base bar with the second bar being an angle bar. The base bar has means formed therealong for slidable containment of an adjustment block means. The adjustment block means is movable along the length of the base bar from the extending end to the pivot end thereof and the angle bar is in engagement therewith so that the angular relationship of the two bars will change in accordance with the position of the adjustment block means. A suitable scale indicative of the resulting angular relationships for the various positions of the adjustment block means is provided on the base bar of the apparatus.

The above described slidably movable adjustment block means provides the apparatus of the present invention with means for establishing non-precision angular relationships between the angle and base bars of the apparatus. In addition, the apparatus is provided with means for establishing precision angular relationships, with this means being of the general type commonly referred to as a "sine-bar" adjustment technique.

Briefly, a sine-bar adjustment technique is one which is employed to set the angular attitude of a bar relative to a support surface. One end of the bar is placed so as to be an engagement with the support surface and precision gage plates, or wires of known thicknesses are placed at a precise location at the other end of the bar. The distance between the one end of the bar and the location of the gage plates, or wires, provides one known side of a triangle with the adjacent side being determined by the thickness of the gage plates or wire. With these two known values, the sine of the angle of the bar relative to the support surface is known, and thus the angle itself, in accordance with established trigonometric principles.

The apparatus of the present invention is configured to utilize the above described sine-bar precision adjustment technique for precise setting of the angular relationship between the base bar and the angle bar thereof. The angle bar is provided with an internally threaded bore formed transversely therein proximate its extending end and a set screw means is mounted therein which provides a contact means. The base bar has an open ended slot formed in its extending end so as to extend longitudinally from the end into the base bar. The slot provided in the base bar provides means for receivingly supporting gage plates, or wires, and when placed therein, they will extend upwardly into engagement with the contact means carried on the angle bar. The thicknesses of the gage plates, or wires, used provides one of the known values and the distance between the pivotably connected ends of the two bars and the contact point of the contact means with the gage plates, or wires, provides the other known value. Therefore, the apparatus of the present invention is provided with means for utilization of the sine-bar type precision adjustment technique.

Accordingly, it is an object of the present invention to provide a new and useful angle block apparatus which is adjustable at various angles for making set-ups for tooling, production, inspection and similar tasks in the machining arts.

Another object of the present invention is to provide a new and useful adjustable angle block apparatus of the above described character which is provided with means for establishing non-precision angular adjustments thereof.

Another object of the present invention is to provide a new and useful adjustable angle block apparatus of the above described character which is provided with means for establishing precision angular adjustments.

Another object of the present invention is to provide a new and useful adjustable angle block apparatus including a pair of elongated bars which are pivotably interconnected and have an adjustment block means slidably movable between the two bars for establishing various non-precision angular relationship between the two bars.

Another object of the present invention is to provide a new and useful adjustable angle block apparatus including an elongated pair of pivotably interconnected bars one having a contact means and the other having gage receiving and supporting means for configuring the apparatus 50 that a sine-bar type of precision angular adjustment technique may be employed for establishing various high precision angular relationships between the two bars.

The foregoing and other objects of the present invention as well as the invention itself, may be more fully understood from the following description when read in conjunction with the accompanying drawings.

BRIEF DESCRIPTION OF THE DRAWINGS

FIG. 1 is a perspective partially exploded view of the adjustable angle block apparatus of the present invention with the apparatus being shown in a typical usage environment.

FIG. 2 is an enlarged side view of the adjustable angle block apparatus with portions thereof being broken away to show the various features thereof.

FIG. 3 is an enlarged sectional view taken along the line 3—3 of FIG. 2.

FIG. 4 is an enlarged sectional view taken along the line 4—4 of FIG. 5.

FIG. 5 is an enlarged fragmentary sectional view of a portion of the apparatus showing the structural relationship between a contact means and a gage receiving and supporting means at an initial stage in the precision adjustment of the apparatus.

FIG. 6 is a view similar to FIG. 5 and showing the apparatus as it would appear after completion of precision adjustment of the apparatus.

DESCRIPTION OF THE PREFERRED EMBODIMENT

Referring more particularly to the drawings, FIGS. 1 and 2 show the adjustable angle block apparatus of the present invention which is indicated generally by the reference numeral 10.

The angle block apparatus 10 includes a first bar 12 which will hereinafter be referred to as the base bar, and a second bar 14 which will be referred to as the angle bar. Each of the bars 12 and 14 are elongated and of four sided configuration and are precision made to provide surface flatness and the like, in accordance with accepted practices common in the precision instrument arts. The base bar 12 is configured as at 16 on one end thereof, and the angle bar 14 is similarly configured at one of its ends, as at 18, to provide hinge means 20 by which those ends 16 and 18, respectively, of the bars 12 and 14 are pivotably interconnected.

The base bar 12 has a surface 22 which faces the angle bar 14 and the angle bar 14 has a surface 24 which faces the base bar 12. When the two bars 12 and 14 are pivotably moved together into a parallel relationship as indicated in FIG. 5, the facing surfaces 22 and 24, respectively, of the two bars 12 and 14 will be in contiguous engagement with each other. When the two bars 12 and 14 are pivotably separated, such as is shown in FIG. 2, the two facing surfaces 22 and 24 of the bars 12 and 14 will define an included angle, as will hereinafter be more fully described.

The apparatus 10 of the present invention is provided with means for establishing a non-precision angular relationship between the two bars 12 and 14 and that means includes an adjustment block means 26 and means 28 formed in the base bar 12 for attaching the adjustment block means 26 to the base bar 12 and permitting sliding movement of the adjustment block means 26 along the length thereof.

The holding means 28 is in the preferred form of a slot of inverted T-shaped cross sectional configuration defining a channel portion 30 having a bottom surface 32 and a relatively narrower throat portion 34 which extends upwardly from the channel portion 34 and opens into the face surface 22 of the base bar 12. The slot, which includes the channel and throat portions 30 and 34, respectively, opens onto the extending end 36 of the base bar 12 and extends longitudinally toward the pivot end 16 thereof.

The adjustment block means 26 includes a slide plate 38 having an integrally formed depending carriage 40. The carriage 40 is of inverted T-shape cross sectional configuration which is sized to fit snugly and yet be slidable in the holding means 28. The adjustment block means 26 further includes a cylindrical dowel rod 42 which is carried on the upper surface of the slide plate and is preferably demountably attached thereto so as to be transverse to the slidably movable direction of the slide plate 38. To accomplish the preferred demountable attachment, the dowel rod 42 is provided with a countersunk bore 44 through which a threaded fastener, such as the illustrated screw 46, passes into threaded engagement with an internally threaded bore 48 formed in the slide plate.

One of the side surfaces 50 of the base bar 12 has a scale 52 etched or otherwise provided thereon, so as to provide a visual indication of the adjustment of the apparatus 10 as determined by the slidably positioning of the adjustment block means 26. In other words, as the adjustment block means 26 is slidably moved in the above described manner, toward, or away from, the hinge means 20 of the apparatus, it will act in the manner of a wedge and the angle bar 14 will be pivotably moved relative to the base bar 12 by simply keeping the face surface 24 of the angle bar in bearing engagement with the dowel rod 42. The scale 52 provides, as mentioned above, an indication of where the adjustment block means 26 needs to be placed to provide a desired angular relationship between the base bar 12 and the angle bar 14.

In addition to the above described means for establishing a non-precision angular adjustment of the apparatus 10, means are also provided for establishing a high precision angular adjustment thereof. The high precision adjustment means includes a contact means 54 on the angle bar 14 and a means 56 is provided on the base bar 12 for receivingly supporting precision gage means 58.

The contact means 54 is in the preferred form of a special screw 60 which is threadingly carried in an internally threaded bore 62 that is formed in the angle bar 14. The threaded bore 62 is formed transversely through the angle bar 14 proximate the extending end 64 thereof and is orineted so as to open onto the face surface 24 thereof and onto the opposite surface 66. Also, the threaded bore 62 is precisely located at a predetermined distance from the pivot axis of the hinge means 20 for reasons which will hereinafter be described in detail.

The special screw 60 is provided with a contact member 68 on its lower end and the contact member is preferably in the form of one half of a cylinder. In other words, if a cylindrical rod (not shown) were to be cut in half along its longitudinal axis, one of the resulting pieces forms the desired shape of the contact member 68. The contact member 68 is disposed on the lower end of the special screw so that the arcuate surface thereof faces away from the threaded shank portion of the screw.

The means 56 provided in the base bar 12 for receivingly supporting precision gage means 58 is the hereinbefore mentioned bottom surface 32 of the channel 30 formed in the base bar 12. More specifically, the means 56 is the area of that bottom surface 32 which is proximate the extending end 36 of the base bar 12.

It will be appreciated that in the event that it were desired to manufacture the angle plate apparatus 10 without the previously described adjusted block means 26, then there would be no need for the T-shaped inverted slot. In such a case, then the face surface 22 of the base bar 12 would serve the same purpose as the bottom surface 32, e.g. supportingly receiving the gage means 58.

Reference is now made in particular to FIGS. 2, 5 and 6 which best show how the contact means 54, gage support means 56 and gage means 58 interact to provide the apparatus 10 with its precision adjustment capability. As hereinbefore mentioned, the contact means 54, e.g. special screw 60, is located a specific distance from the pivot axis of the hinge means 20. When the face surface 24 of the angle bar 14 is moved into contiguous engagement with the face surface 22 of the base bar 12, the special screw 60 is adjusted so that its contact member 68 is touching the bottom surface 32 of the channel 30 defined by the base bar 12 at a point 70 on that surface. In this manner, the distance between the special screw 60 and the pivot axis of the hinge means 20 will be identical to the distance between the point 70 and the pivot axis of the hinge means. That known distance which is identified as distance "A" is considered as the hypotenuse of a right triangle and is used in establishing a desired angular attitude of the angle bar 14. When it is desired to set the angle bar 14 at a known angle, which is identified as angle "C" in FIG. 6, that known angle and the known distance "A" are used to determine a precise distance "B" which will produce that desired angle "C" in accordance with the well known trigonometric principle known as the sine function. When the distance "B" has been determined in this manner, the gage means 58, in the illustrated form of a plurality gage plates selected to provide a combined thickness equal to the desired distance "B", are placed on the gage receiving and supporting means 56. Therefore, with the gage means 58 positioned on the surface 32 above the contact point 70 of the base bar 12 and the angle bar being moved to bring the arcuate peripheral surface of the contact member 68 of the special screw 60 into bearing engagement with the gage means 58, the angle bar 14 will be set at the precise desired angular relationahip with respect to the base bar 12.

It will be appreciated from the above description that the adjustable angle block apparatus 10 of the present invention can be used as a set up tool, or the like, to accomplish a variety of tasks in a machine shop and similar environments. An example of one such use is illustrated in FIG. 1 wherein the preadjusted apparatus 10 is placed between the jaws of a machinists vice 72 with the base bar 12 being supported in a horizontal attitude on the vice. Placement of a workpiece 74, or tool, (dashed lines) in resting engagement with the surface 66 of the angle bar 14 will orient that workpiece, or tool, 74, at the desired angular attitude determined by the adjusted position of the angle bar 14. Then by closing the jaws of the vice 72, the workpiece, or tool, 74 will be held in the desired position for whatever tasks are to be accomplished by or on the workpiece or tool 74.

While the principles of the invention have now been made clear in the illustrated embodiments there will be immediately obvious to those skilled in the art, many modifications of structure, arrangements, proportions, the elements, materials and components used in the practice of the invention and otherwise, which are particularly adapted for specific environments and operation requirements without departing from those principles. The appended claims are therefore intended to cover and embrace any such modifications within the limits only of the true spirit and scope of the invention.

What I claim is:

1. An adjustable angle block apparatus comprising:
   (a) an elongated base bar having a hinge end, an extending end and a longitudinal face surface;
   (b) an elongated angel bar having a hinge end, an extending end and a longitudinal face surface;
   (c) hinge means interconnecting the hinge ends of said base bar and said angle bar with the face surfaces thereof being in facing relationship with each other, said hinge means defining a pivot axis;
   (d) said angle bar having an internally threaded bore proximate the extending end thereof at a known predetermined distance from the pivot axis defined by said hinge means and disposed transversely of said angle bar so as to open onto the face surface thereof;
   (e) slot means formed at the extending end of said base bar and having a bottom surface which is parallel and recessed below the face surface of said base bar for receivingly supporting a gage means of known thickness dimension; and
   (f) a screw threadingly carried in the bore of said angle bar and having a contact member on the end thereof which is nearest to said base bar, said screw being threadingly adjusted so that the contact member thereof is in touching engagement with the bottom surface of the slot means defined by said base bar when said base bar and said angle bar have their facing surfaces in contiguous bearing engagement with each other, said screw having the contact member thereof in bearing engagement with the receivingly supported gage means to support said angle bar in an angular attitude determined by the thickness dimension of the received gage means.

2. An apparatus as claimed in claim 1 wherein said base bar is configured so that said slot means opens onto the extending end and onto the face surface of said base bar.

3. An angle block apparatus having a non-precision and precision adjustment capabilities comprising in combination:
   (a) an elongaged base bar having a hinge end, an extending end and a longitudinal face surface;
   (b) an elongated angle bar having a hinge end, an extending end and a longitudinal face surface;
   (c) hinge means interconnecting the hinge ends of said base bar and said angle bar with the face surfaces thereof being in facing relationship with each other, said hinge means defining a pivot axis;
   (d) adjustment block means of fixed dimensional configuration for establishing non-precision angular positioning of said angle bar relative to said base bar;
   (e) slot means formed along the length of said base bar for demountably carrying said adjustment block means in a substantially normally extending attitude on the face surface thereof and allowing sliding movement of said adjustment block means into an infinite number of positions along the face surface of said base bar in an interposed position between and in engagement with the face surfaces of said base bar and said angle bar; and (f) means for establishing precision angular positioning of said angle bar relative to said base bar, said means being proximate the extending ends of said angle bar and said base bar at a known predetermined distance from the pivot axis defined by said hinge means and including, I. said angle bar having an internally threaded bore disposed transversely of said angle bar so as to open onto the face surface thereof, II. said slot means formed in said base bar having a bottom surface which is parallel and recessed relative to the face surface of said base bar for receivingly supporting a gage means of predetermined known thickess;

III. a screw threadingly carried in the bore of said angle bar and having a contact member on the end thereof which is nearest to said base bar, said screw being threadingly adjusted so that the contact member thereof is in touching engagment with the bottom surface of the slot means defined by said base bar when said base bar and said angle bar have their facing surfaces in contiguous engagement with each other, said screw having the contact member thereof in bearing engagement with the gage means when receivingly supported in said slot means defined by said base bar to position said angle bar in a precision angular attitude determined by the thickness of the receivingly supported gage means.

4. An apparatus as claimed in claim 3 wherein said adjustment block means comprises:

(a) a slide plate;
 (b) means depending from said slide plate for demountably and slidably mounting said slide plate on the face surface of said base bar; and
 (c) a cylindrical rod on the upper surface of said slide plate and transverse to the slidably movable direction of slide plate, said cylindrical rod being for engaging the face surface of said angle bar.

5. An apparatus as claimed in claim 4 wherein said means depending from said slide plate is a carriage of inverted T-shape configuration.

6. An apparatus as claimed in claim 5 wherein said slot means formed along the length of said base bar opens onto the extending end and onto the face surface of said base bar, said slot means being of inverted T-shape cross section for slidably receiving said carriage of said adjustment block means.

* * * * *